N. SCHLESSER.
Rotary Vegetable-Cutters.
No. 140,221.  Patented June 24, 1873.
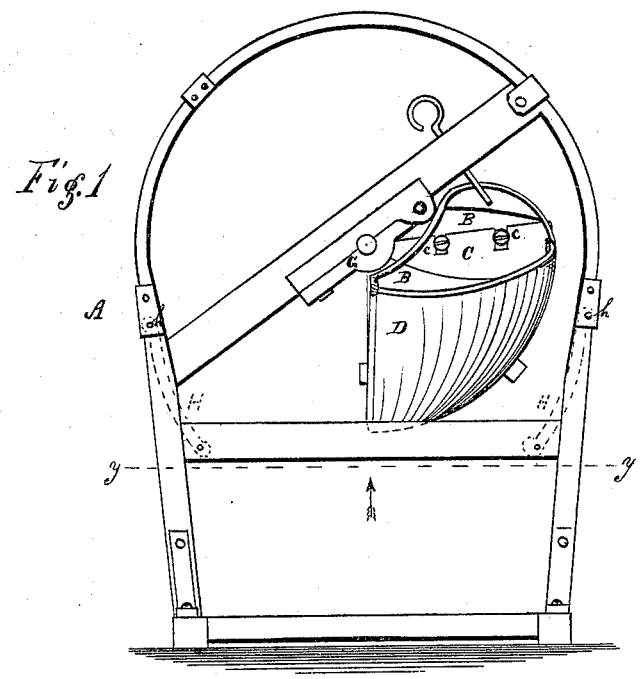
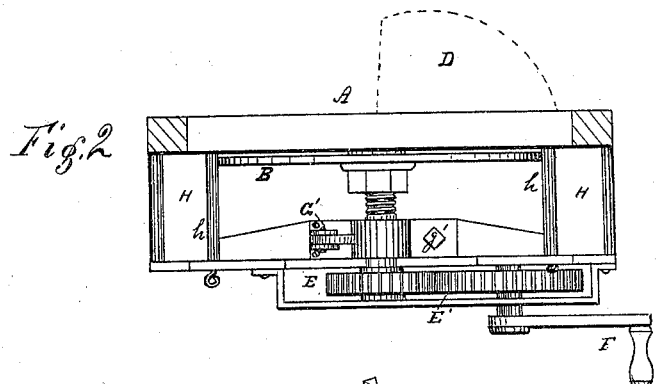
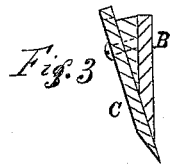
Witnesses
F. H. Brown
F. A. Herring
Inventor
Nicholas Schlesser
By Gridley & Warner
his attys

UNITED STATES PATENT OFFICE.

NICHOLAS SCHLESSER, OF CHICAGO, ILLINOIS.

IMPROVEMENT IN ROTARY VEGETABLE-CUTTERS.

Specification forming part of Letters Patent No. 140,221, dated June 24, 1873; application filed November 11, 1872.

*To all whom it may concern:*

Be it known that I, NICHOLAS SCHLESSER, of Chicago, county of Cook and State of Illinois, have invented certain new and useful Improvements in Cabbage-Cutters; and I do hereby declare the following to be a full, clear, and exact description thereof, which will enable others skilled in the art to make and use the same, reference being had to the accompanying drawing, forming a part hereof, in which—

Figure 1 is a front elevation of my improved cabbage-cutter. Fig. 2 is a bottom view or horizontal cross-section of the same, taken in the plane of line $y\ y$, Fig. 1, and viewed in the direction indicated by the arrow; and Fig. 3 is a vertical cross-section through the disk and one of the knives.

Similar references indicate like parts.

My invention relates to that class of cutters which are intended for the purpose of cutting or slicing vegetables; and it consists in certain novel features relating to the construction and arrangement of various parts of the device, all of which is hereinafter more fully described.

In the drawing, A represents the case or frame of the cutter. B is a rotary disk having bearings in the case or frame A, and C C are adjustable knives or cutters arranged in the disk B. D is a hopper for the purpose of receiving the cabbage or other vegetables, and carrying the same to the knives. E is a cog-wheel arranged on the shaft or arbor of the disk B, and E' is also a cog-wheel engaging the wheel E. F is a crank attached to the shaft or arbor of the wheel E', for the purpose of turning the cutter-mechanism.

In order to feed the cut vegetables into a suitably-small receptacle, I deem it preferable to make the case A approximate to the circular form of the disk B; and in order to admit of the disk being readily removed from the case for the purpose of being cleaned, I arrange it in hinged bearings G G', the free ends of which are locked together by means of bolts or screws, as shown at $g\ g'$. I also make the sides of the case A of hinged parts H H, the rear ends of which are retained in position by means of bolts $h\ h$. By removing the bolts or screws $g\ g'$ and $h\ h$, the disk may be readily removed from the case. The knives are slotted and attached to their disk by means of set-screws, as shown at $c\ c$, so that they may be readily adjusted to cut thick or thin slices from the vegetables. The disk B is also slotted behind the cutting-edge of the knives, so as to admit of the cut part of the vegetables passing freely through the disk and falling into a suitable receptacle.

The knives C C, instead of being arranged on the front side of the disk B, as shown in Fig 1, may be arranged on its rear side, as shown in Fig. 3.

Instead of gearing E E', beveled gearing may be employed when it is more convenient to apply the power by means of the latter; or a band or belt-wheel may be employed when the power is directly applied by means of water force. D is a removable hopper, which I prefer to make disk-shaped, in the manner shown, so that the vegetables will be carried directly to the knives, especially if a downward pressure is exerted upon them.

It will be observed from the foregoing description that, by placing the vegetables in the hopper and turning the disk, they will be cut in slices of various thickness, according to the adjustment of the knives; and that the latter may be readily adjusted, and the disk readily removed for the purpose of being cleaned and repaired. The case is closed in all its parts, except at the hopper and at the bottom, so that the cut vegetables will be delivered into a suitable receptacle, without being scattered by the rotary movement of the disk.

What I claim as new, and desire to secure by Letters Patent, is—

The slotted rotary disk B, provided with the adjustable cutters C C, and having bearings in the hinged parts G and G', in combination with the case or frame A, provided with the hopper D and the hinged wings H H, in connection with mechanism for operating the same, all substantially as specified.

NICHOLAS SCHLESSER.

Witnesses:
JOHN P. SCHLESSER,
JOHN THIEN.